United States Patent
Mayer et al.

(10) Patent No.: US 7,186,394 B2
(45) Date of Patent: Mar. 6, 2007

(54) RETARDING AGENTS FOR PREPARING PURIFIED BRINE

(75) Inventors: Mateo Jozef Jacques Mayer, Giesbeek (NL); René Lodewijk Maria Demmer, Enter (NL)

(73) Assignee: Akzo Nobel N.V., Arnhem (NL)

( * ) Notice: Subject to any disclaimer, the term of this patent is extended or adjusted under 35 U.S.C. 154(b) by 393 days.

(21) Appl. No.: 10/167,922

(22) Filed: Jun. 12, 2002

(65) Prior Publication Data

US 2003/0000897 A1    Jan. 2, 2003

Related U.S. Application Data

(60) Provisional application No. 60/299,654, filed on Jun. 20, 2001.

(30) Foreign Application Priority Data

Jun. 19, 2001    (EP)    ................................ 01202339

(51) Int. Cl.
*C22B 26/10*    (2006.01)
*C02F 5/00*    (2006.01)

(52) U.S. Cl. .................. 423/499.5; 23/303; 423/499.4; 210/639; 210/698; 210/699; 210/701; 252/175; 252/180; 252/181

(58) Field of Classification Search ................ 210/634, 210/638, 639, 660, 687, 696–702, 723–725, 210/749, 806; 423/554, 164, 265, 499.4, 423/499.5, 184, 179; 23/303; 252/175–181
See application file for complete search history.

(56) References Cited

U.S. PATENT DOCUMENTS

| 2,433,601 | A | * | 12/1947 | Cornstock | ................... 423/186 |
|---|---|---|---|---|---|
| 2,902,418 | A | * | 9/1959 | Burns | ........................ 205/536 |
| 2,906,599 | A | | 9/1959 | Roland | |
| 2,906,600 | A | | 9/1959 | Roland | |
| 3,140,915 | A | | 7/1964 | Axelrad et al. | |
| 3,155,458 | A | | 11/1964 | Fiedelman et al. | |
| 3,385,675 | A | * | 5/1968 | Fiedelman | ................... 423/179 |
| 3,682,601 | A | * | 8/1972 | Fedesoff et al. | ............... 23/300 |
| 4,026,676 | A | * | 5/1977 | Fiedelman | .................... 23/298 |
| 4,215,009 | A | * | 7/1980 | Spaziante et al. | ............ 252/184 |
| 4,640,793 | A | * | 2/1987 | Persinski et al. | ............ 252/180 |
| 4,923,617 | A | * | 5/1990 | Heilweil et al. | ............. 252/180 |
| 6,063,290 | A | * | 5/2000 | Failon et al. | ................ 210/699 |

FOREIGN PATENT DOCUMENTS

| DE | 155341 | 9/1975 |
|---|---|---|
| DE | 115677 | 5/1999 |

OTHER PUBLICATIONS

Derwent Abstract No. XP-002181690, abstracting Japanese Patent No. JP 19960058495.

* cited by examiner

*Primary Examiner*—Joseph Drodge
(74) *Attorney, Agent, or Firm*—Richard P. Fennelly; Louis A. Morris

(57) ABSTRACT

The invention relates to a process to produce brine of improved purity wherein a salt source, contaminated with sulphate ions and alkaline (earth) metal ions, is dissolved in water in the presence of an effective amount of a retarding agent comprising at least one low and at least one high molecular weight retarding agent. Said retarding agent effectively reduces the level of the alkaline (earth) metal sulphate dissolved in the brine, particularly the amount of calcium and sulphate. Preferably, the combination of the low and high molecular weight retarding agents is synergetic in the reduction of dissolved alkaline-earth metal sulphate.

4 Claims, No Drawings

RETARDING AGENTS FOR PREPARING PURIFIED BRINE

The present application claims priority of U.S. provisional application No. 60/299,654 filed on Jun. 20, 2001 and European patent application No. 01202339.6 filed on Jun. 19, 2001.

FIELD OF THE INVENTION

The present invention relates to a process for producing high purity brine by dissolution of a salt source containing alkaline (earth) impurities and the production of high quality salt from said brine.

BACKGROUND OF THE INVENTION

Much of today's salt (essentially NaCl) is produced by means of evaporative processes wherein salt is crystallized from brine. The use of high purity brine has various advantages in such a process.

Said brine is typically obtained by solution mining of rock salt deposits. Rock salt, mainly originating from maritime sedimentation, contains alkaline-earth metal (like Ca, Mg and Sr) and potassium salts as the most important impurities. Sulfate, chloride and bromide are typical counter-ions. Together with the sulfate ion, calcium will be present as the rather insoluble $CaSO_4$ (anhydrite) or/and as polyhalite ($K_2Mg_2Ca_2(SO_4)_4 \cdot 4H_2O$).

The total amount of calcium and sulfate in rock salt deposits depends on the deposit itself, but, for example, may also vary with the depth at which the salt mined. Calcium is typically present in an amount from 0.5 to 6 gram per kilogram and sulfate from 0.5 to 16 gram per kilogram. Solution mining is a technique with which well soluble salts can be mined at special spots in a deposit. The advantage of this method is that poorly soluble impurities, like anhydrite ($CaSO_4$) and gypsum ($CaSO_4 \cdot 2H_2O$), will remain partly in the cavern being exploited. The resulting brine, however, can be saturated with these undesired impurities. Without any treatment the alkaline (earth) impurities in raw brine, obtained from any of the mentioned sources, will cause severe incrustations in the heating tubes of a vacuum crystallizer of NaCl. Hardly removable calcium sulfate in several appearances will block the tubes and frustrate the heat transfer. Inter alia, contamination of the resulting salt and poor energy efficiency of the process will be the consequence. High purity brine is also of interest for processes wherein salt solutions are used as a raw material, such as in the chemical transformation industry, e.g. the chlorine and chlorate industry. Especially the conversion from mercury and diaphragm technology to the more environmentally acceptable membrane technology triggered the demand for high purity brine. The brine for use in these processes is typically obtained by dissolution of a salt source, which can be rock salt, salt from evaporative processes as described above, and/or solar salt, including lake or sea salt. It is noted that sea salt typically contains less than 0.5 g/l of $CaSO_4$ due to the fact that the $CaSO_4$ is typically present in the form of gypsum with just a limited solubility.

The use of higher purity brine was found to be of interest for this industry because it allows a better energy efficiency as well as the formation of less waste. Also the products resulting from the chemical transformation industry can be of higher quality if brine with high purity is used to make them.

Accordingly, there have been many efforts to improve the quality of brine. A first solution was to use high purity salt, which was dissolved to make such brine. Such high purity salt can be obtained by preventing calcium sulfate from crystallizing in the salt production process by adding specific seeds or by applying a scaling inhibitor. U.S. Pat. No. 3,155,458, for instance, discloses to add starch phosphate to the brine in the evaporative crystallization process. It is said that the starch phosphate enhances the solubility of the $CaSO_4$, and thus prevents the scaling and allows production of salt with high purity and low $CaSO_4$ content.

However, such a process requires the undesired bleed of a $CaSO_4$-rich stream from the crystallization process, and also requires that the brine is essentially bicarbonate-free.

Another solution is to remove impurities from the raw brine by a chemical treatment of said brine. An example of such a treatment is given in the already more than 100 years old Kaiserliches Patentamt DE-115677, wherein hydrated lime is used to precipitated magnesium hydroxide and gypsum from the raw brine.

In addition to, or instead of, these methods, there have also been efforts to increase the purity of the brine by reducing the amount of impurities, such as the above-mentioned anhydrite, gypsum, and polyhalite (and/or their strontium analoques), that dissolve into said brine. This is typically done by adding certain agents to the water that is used in the process, or by mixing such agents with the salt source before adding water (especially for solar salt dissolvers). Hereinafter, such agents are called "retarding agents".

DD-115341 discloses that brine, particularly for use in processes to make soda ash, with a reduced amount of $CaSO_4$ and $MgSO_4$ can be obtained by adding calcium lignin sulfonate to the water that is used to produce the brine solution. The addition of calcium lignin sulfonate allegedly lowers the solubility of the $CaSO_4$ and $MgSO_4$.

U.S. Pat. No. 2,906,599 discloses to use a group of phosphates, denominated "polyphosphates", including hexametaphosphates, to reduce the dissolution rate of calcium sulfate (anhydrite), leading to brine with reduced sulfate and calcium ions. At lower concentration (i.e. up to 50 ppm in the brine) hexametaphosphates were found to be the most effective agent, sodium hexametaphosphate being the preferred retarding agent.

Currently, another type of retarding agent is being marketed by Jamestown Chemical Company Inc. under the name (Sulfate Solubility Inhibitor) SSI® 200. According to the material safety data sheet the material contains dodecylbenzene sulfonic acid, sulfuric acid and phosphoric acid.

The present invention alleviates the deficiencies of the prior art by providing for new retarding agent compositions, their use in the process to produce (high purity) brine from a salt source, as well as the use of the so-obtained brine in membrane electrolysis processes.

SUMMARY OF THE INVENTION

The present invention generally relates to a process of making a high purity brine, wherein a salt source, contaminated with sulfate ions and alkaline (earth) metal ions other than sodium, is dissolved in water in the presence of an effective amount of at least a low and a high molecular weight retarding agent. The retarding agent effectively reduces the level of said alkaline (earth) metal sulfate dissolved in said brine, particularly the amount of calcium and sulfate, preferably said level is reduced such that at most 70% of the alkaline (earth) metal sulfates is dissolved when compared to a blank dissolution step wherein the combination of retarding agents is not used.

DETAILED DESCRIPTION OF THE INVENTION

The present inventors have surprisingly found that the use of a specific combination of compounds results in a reduction of the level of contaminants, particularly calcium sulfate, in brine obtained by dissolution of a salt source, when compared to brine obtained when conventional retarding agents are used. It was observed that the above particularly holds when the salt source is contaminated with anhydrite, gypsum, polyhalite, the strontium-containing equivalents of these compounds and/or clay minerals.

Accordingly, the invention relates to a process to make brine, by dissolving a salt source that is contaminated with a source of alkaline-earth metal sulfate in water, wherein an effective amount of a combination of at least a low and a high molecular weight retarding agents is used to reduce the amount of alkaline-earth metal sulfate dissolved in said brine. Preferably, the combination of two or more compounds is synergetic in the reduction of dissolved alkaline-earth metal sulfate. Preferably, the retarding agents have at least one polar group and at least one apolar segment in the molecule.

It was found that the so-obtained high purity brine could be used without further purification in both evaporative salt crystallization and the chemical transformation industry. However, if so desired, the brine may be further purified by means of the conventional chemical treatment. Also, the use of scaling inhibitors and/or specific seeds in the evaporative crystallization technique, to prevent $CaSO_4$ precipitation, is not required any longer. However, if so desired, the scaling inhibitors and/or specific seeds may be used in combination with the high purity brine of the present process, that is optionally further purified by chemical treatment.

Furthermore, it was found that the use of retarding agents according to the invention resulted in systems that show very little foaming, a disadvantage that is often observed in conventional systems comprising sulfonates and the like.

In a preferred embodiment, the invention relates to a process to make high purity brine from a salt source wherein anhydrite and/or polyhalite are present.

It is noted that the term "salt" as used throughout this document is meant to denominate all salts of which more than 25% by weight is NaCl. Preferably, such salt contains more than 50% by weight of NaCl. More preferably, the salt contains more than 75% by weight of NaCl, while a salt containing more than 90% by weight NaCl is most preferred. The salt may be solar salt (salt obtained by evaporating water from brine using solar heat), rock salt, and/or subterraneous salt deposits. Preferably it is a subterraneous salt deposits being exploited by means of dissolution mining. Since the various sources of the salt render salt with different compositions, especially with respect to contaminants, one typically has to evaluate the performance of the retarding agents to optimize their effect.

The performance of the combination of compounds as retarding agents, and whether or not they are synergistic, is quickly and easily determined using the following dissolution test method. The salt source is crushed in order to obtain particles of 0.1 to 1.5 cm. A fresh stock solution of about 1000 mg/l retarding agent compound(s) is prepared and the desired amount of this stock solution (the amount to be evaluated) is added to a 1 liter beaker glass filled with such an amount of demineralized water that the total volume after adding the stock solution is 660 ml. A blank experiment, wherein no retarding compound is used, is conducted simultaneously. The beaker glass is stirred with a magnetic, Teflon coated, stir bar with a tapered round design and a size of 50×9 mm (as obtainable from Aldrich Cat. No. Z28,392-4) at 200 rpm and thermostatted at 20° C. To this solution, 300 g of the crushed core sample is added and the mixture is continuously stirred at 200 rpm. After 1 hour, samples are taken of the brine. For this purpose, the magnetic stirrer is stopped and a desired amount of brine sample is taken and filtered over a 0.2 micron filter. Subsequently, the filtered brine sample is analyzed on the amount of dissolved Ca, Mg, K, Sr, and/or $SO_4$ ions.

In order to test the long term performance of the retarding agents, the test can be continued for several days, preferably more than 5 days. In order to prevent erosion of the salt source, the mixture is not stirred in this period, and samples are taken once a day. Prior to sampling, the mixture is stirred by hand for one minute, using a 4 mm thick glass rod, so that the aqueous phase is homogeneous. The performance of the retarding agent is defined as the percentage that the concentration of the ions concerned is reduced as compared to the blank sample.

The performance is preferably such that a retardation of the dissolution (in meq./l) of one or more of the alkali metal ions, alkaline-earth metal ions, and/or sulfate ion is more than 20%, preferably more than 30%, more preferably more than 40%, even more preferably more than 50%, and most preferably more than 70% is observed, when compared to the blank. If the long-term performance (after 5 days) is insufficient, preferably the retarding compound with the higher molecular weight is to be increased in concentration and/or its molecular weight is to be increased. If the retardation after 1 day is less than desired, then preferably the amount of the low molecular weight compound is to be increased.

The amount of the retarding agents that is to be used depends on the quality of the salt source, the quality of the water to produce the brine, and the type of agents used. Generally, the amount for each retarding agent will be less than 0.1%, preferably less than 0.05%, more preferably less than 0.02% by weight of the water, while a concentration of less than 0.01% of each of the compounds is most preferred. Depending on the circumstances more or less of each of the retarding compounds is to be used. Preferably, the weight ratio between the low and high molecular weight retarding agent is from 100:1 to 1:100. More preferably the weight ratio between the low and high molecular weight retarding agent is from 20:1 to 1:20.

Although the inventors do not wish to be bound by the following theory, it is believed that the excellent and preferably synergistic properties of the combination of compounds is due to:

i) a fast covering of the surface of the alkaline-earth metal source by the compound with the lowest molecular weight,
ii) a faster coverage of the surface of the calcium source of step i) by the retarding agent with the highest molecular weight (compared to the coverage rate of an uncovered alkaline-earth metal source),
iii) a relatively fast desorption of the retarding agent with the lowest molecular weight, and
iv) hardly any desorption of the retarding agent with the highest molecular weight, and
v) interaction of the low molecular weight retarding agent with the apolar segment(s) of the high molecular weight retarding agent Although the combination of retarding agents is not optimized, we prefer to use a low molecular weight compound with a molecular weight of less than 1000, more preferably less than 800, even more preferably less than 600, even more preferably less than 500, and most preferably less than 400 Dalton, in combination with a retarding agent having a higher molecular weight than that of the low molecular weight compound, preferable with a molecular weight of at least 500, more preferably at least 600, even more preferably more than 800, even more preferably more than 1000, and most preferably more than 1250 Dalton. Depending on the structure of the high molecular weight retarding agent, it can be of very high molecular weight, up to several million Dalton, provided that the product is still water-soluble or water-dispersible, e.g. through formation of bi-layers whereof the polar functions interact with the water. The high and low molecular weight retarding compound can be any compound that satisfies the desired retardation performance when tested as described above. Suitable high molecular weight compounds include lignosulfates, phospholipids, hydrolyzed phospholipids, polyacrylates, as well as various other compounds with, optionally substituted, linear or branched, alkyl backbones that are functionalized with sulfonate, sulfate, phosphite, phosphonate, phosphate, and/or carboxyl groups, which include less preferred compounds that are conventionally known as flocculants. It is preferred that such compounds have at most three, more preferably two, apolar alkyl chains per polar function, in order to achieve the best retarding properties. Preferably the molecular weight of the low molecular weight retarding agent is about the same (+/−20% by weight) as the molecular weight of one of the apolar segments of the high molecular weight material. Although the retarding agents may comprise two or more ethoxy- and/or propoxy-repeating units, it is preferred that less than 20, preferably less than 10, more preferably less than 5 and most preferably less than 3 ethoxy- and/or propoxy-units are present per molecule of the retarding agent.

Although various sources and combinations of the retarding agents can be used, it is preferred to use retarding agents that are not environmentally suspect. More specifically, it is preferred to use retarding agents that are present in biomembranes (membranes of naturally occurring organisms). Typically, such biomembrane-derivable retarding agents are very good high-molecular weight retarding agents and are therefore, preferably used as such in combination with a lower-molecular weight compound. Because of their efficiency as a (high molecular weight) retarding agent, the use of biomembrane-derivable phospholipids and/or hydrolyzed phospholipids are preferred.

It is possible to use a phospholipid mixture containing both low and high-molecular weight phospholipids to act as the combination of retarding compounds. Especially if such a mixture can be derived from a natural source in a single step, such mixtures can be preferred.

In a most preferred embodiment, the high-molecular weight retarding agent is a high molecular weight phospholipid that is obtained from yeast-cells, particularly baker-yeast cells. Such yeast cells can be cultured on-site. If low levels of sugar or other substrate in the brine are acceptable one could add a small amount of yeast and sugar (or any other suitable substrate for the yeast) to the water in which the salt is dissolved, so that yeast is cultured just before the dissolution of the salt.

In a most preferred embodiment, the low molecular weight compound is selected from the group consisting of:
alkylbenzene sulfonates, whereof the alkyl groups can be linear or branched,
phosphates, preferably polyphosphates, including alkali metal and ammonium polyphosphates that are water-soluble,
ethoxylated compounds with one or more sulfite, sulfonate, sulfate, phosphite, phosphonate, phosphate, and/or carboxylgroups, and/or
$C_2$–$C_{40}$ alkylgroups, preferably $C_2$–$C_{20}$ alkylgroups, with one or more sulfite, sulfonate, sulfate, phosphite, phosphonate, phosphate, and/or carboxyl groups, such as polyacrylic acids.

The term polyphosphate includes metaphosphates, such as hexametaphosphate $(Na_3PO_3)_6$, tripolyphosphates $(Na_5P_3O_{10})$, tetraphosphates $(Na_6P_4O_{13})$, pyrophosphates, such as $Na_4P_2O_7$ and $Na_2H_2P_2O_7$, as well as various other complex phosphates that are typically derived from orthophosphoric acid compounds by molecular dehydration, and mixtures of two or more of these phosphates.

It is noted that the performance of the retarding agent (mixtures) can be influenced negatively by the presence of impurities such as biomaterial and/or clay minerals in the process water that is used for dissolving the salt and/or by the presence of such impurities in the salt deposit. This problem is believed to originate from adsorption of (part of) the retarding agent (mixture) onto the surface of these biomaterial and/or clay mineral impurities. It goes without saying that removing the impurities from the water can solve this problem by filtration or from the salt by a solid-solid separation prior to dissolving the salt. However, it is noted that it is also possible to add a component to the retarding agent mixture that specifically adsorbs onto the biomaterial and/or clay mineral impurities. In that way, the adsorption of retarding agent onto these impurities can be prevented thereby increasing the performance of the retarding agent (mixture).

EXPERIMENTAL

Low Molecular Weight Retarding Agents:
  SDBS (sodium dodecyl benzene sulfonate)=Marlon® ARL ex Condea Chemie
  Na-pyrophosphate=sodiumpyrophosphate ex J. T. Baker
High Molecular Weight Retarding Agents:
  Na-lignosulfonate=Darvan® 2 ex Vanderbilt
  Yeast DSM=Dried inactive bakery yeast ex DSM
  Bakers Yeast=active yeast as used in bakeries=a high molecular weight retarding agent.

Examples 1–3 and Comparative Examples A–C

A core from the Akzo Nobel salt mine in Stade, Germany, was subjected to the above-mentioned dissolution test method while various retarding agents were evaluated. The amount of dissolved Ca and $SO_4$ (meq/l) after 1 and 4 days was determined and the average performance (perf.) calculated. The results are presented in the following table.

| Exam- | | after one day | | | after four days | | |
|---|---|---|---|---|---|---|---|
| ple | Retarding agent used | Ca | $SO_4$ | perf. | Ca | $SO_4$ | perf. |
| A | None | 41 | 41 | n.r. | 51 | 51 | n.r. |
| B | Bakers Yeast (30 ppm) | 36 | 36 | 12% | 46 | 46 | 10% |

-continued

| Example | Retarding agent used | after one day | | | after four days | | |
|---|---|---|---|---|---|---|---|
| | | Ca | SO$_4$ | perf. | Ca | SO$_4$ | perf. |
| C | Bakers yeast (30 ppm) + Na-lignosulfonate (30 ppm) | 37 | 38 | 9% | 45 | 46 | 11% |
| 1 | Bakers yeast (30 ppm) + SDBS (30 ppm) | 19 | 19 | 54% | 22 | 22 | 57% |
| 2 | Na-lignosulfonate (30 ppm) + SDBS (30 ppm) | 27 | 27 | 34% | 30 | 31 | 40% |
| 3 | Bakers yeast (30 ppm) + Na-pyrophosphate (30 ppm) | 23 | 23 | 44% | 29 | 30 | 42% | n.r. = not relevant

Similarly, a core from an Akzo Nobel salt mine in Delfzijl was evaluated, with the following result:

| Example | Retarding agent used | after two days | | | after four days | | |
|---|---|---|---|---|---|---|---|
| | | Ca | SO$_4$ | perf. | Ca | SO$_4$ | perf. |
| D | None | 28 | 71 | n.r. | 39 | 95 | n.r. |
| E | Bakers Yeast (30 ppm) | 27 | 63 | 9% | 29 | 89 | 12% |
| F | Na-lignosulfonate (30 ppm) | 35 | 75 | <0% | 38 | 90 | 4% |
| G | SDBS (30 ppm) | 20 | 48 | 31% | 32 | 63 | 29% |
| 4 | Bakers yeast (30 ppm) + SDBS (30 ppm) | 17 | 32 | 51% | 20 | 39 | 56% |

Clearly, the combination of high and low molecular weight retarding agent is beneficial in reducing the amount of dissolved Ca and SO$_4$ ions. Furthermore, the samples wherein just SDBS showed more of the undesired foaming than the samples wherein retarding agents according to the invention were used.

We claim:

1. A process of making a high purity brine from a salt source contaminated with sulfate ions and alkaline (earth) metal ions other than sodium, wherein said process comprises dissolving said salt source in water in the presence of at least a low and high molecular weight retarding agent, wherein said retarding agent comprises at least one low molecular weight compound and at least one high molecular weight compound, wherein (I) said at least one low molecular weight retarding agent is selected from the group consisting essentially of alkylbeazene sulfonates, whereof the alkyl groups can be linear or branched, phosphate that an water-soluble, ethnylated compounds with one or more sulfite, sulfonate, sulfate, phosphite, phosphonate, phosphate, and/or carboxylgroups, and C$_2$–C$_{40}$ alkyl compounds with one or more sulfite, sulionate, sulfate, phosphite, phosphonate, phosphate, and/or carboxyl groups, and (II) said at least one high molecular weight retarding agent is selected from the group consisting essentially of lignosulfates, phospholipids, and polyacrylates.

2. A process of making a high purity brine from a malt source contaminated with sulfate ions and alkaline (earth) metal ions other than sodium, wherein said process comprises dissolving said salt source in water in the presence of at least a low molecular weight retarding agent having a molecular weight of less than 1,000 Dalton selected from the group consisting of: alkylbenzene sulfonates, whereof the alkyl groups can be linear or branched, phosphates that are water-soluble, ethoxylated compounds with one or more sulfite, mnifonate, sulfate, phosphite, phosphonate, phosphate, and/or carboxylgroups, and C$_2$–C$_{40}$ alkyl compounds with one or more sulfite, sulfonate, sulfate, phosphite, phosphonate, phosphate, and/or carboxyl groups, and a high molecular weight retarding agent having a higher molecular weight than that of said low molecular weight retarding agent but being at least 500 Dalton and wherein said retarding agents are present in an amount effective to reduce the level of said sulfate ions and alkaline (earth) metal ions dissolved In said brine, thereby producing a high purity brine.

3. A process of making a high purity brine from a salt source contaminated with sulfate ions and alkaline (earth) metal ions other than sodium, wherein said process comprises dissolving said salt source in water in the presence of at least a low molecular weight retarding agent having a molecular weight of less than 1,000 Dalton and a high molecular weight retarding agent having a higher molecular weight than that of said low molecular weight retarding agent but being at least 500 Dalton, wherein said retarding agents comprise a mixture of low- and high-molecular weight phospholipids, and wherein said retarding agents are present in an amount effective to reduce the level of said sulfate ions and alkaline (earth) metal ions dissolved in said brine, thereby producing a high purity brine.

4. The process of claim 3 wherein said high molecular weight retarding agent is a high molecular weight phospholipid that is derived from yeast cells.

* * * * *